United States Patent
Ponukarin et al.

(10) Patent No.: US 10,247,229 B2
(45) Date of Patent: Apr. 2, 2019

(54) BALL JOINT AND METHOD OF FASTENING A SEALING BELLOWS TO A BALL JOINT

(75) Inventors: Vladimir Ponukarin, Dusseldorf (DE); Cengiz Erdogan, Geldern (DE)

(73) Assignee: THK RHYTHM AUTOMOTIVE GmbH, Düsseldorf (DE)

( * ) Notice: Subject to any disclaimer, the term of this patent is extended or adjusted under 35 U.S.C. 154(b) by 0 days.

(21) Appl. No.: 13/509,384

(22) PCT Filed: Nov. 9, 2010

(86) PCT No.: PCT/EP2010/006818
§ 371 (c)(1),
(2), (4) Date: Aug. 3, 2012

(87) PCT Pub. No.: WO2011/057758
PCT Pub. Date: May 19, 2011

(65) Prior Publication Data
US 2012/0308295 A1 Dec. 6, 2012

(30) Foreign Application Priority Data
Nov. 12, 2009 (DE) .......................... 10 2009 052 923

(51) Int. Cl.
*F16C 11/06* (2006.01)
*F16J 3/04* (2006.01)

(52) U.S. Cl.
CPC ........... *F16C 11/0671* (2013.01); *F16J 3/042* (2013.01); *Y10T 29/49826* (2015.01); *Y10T 403/31* (2015.01); *Y10T 403/32631* (2015.01)

(58) Field of Classification Search
CPC . F16J 3/042; F16J 15/52; F16J 15/525; F16C 11/0671; F16C 11/0666; F16D 3/845; F16D 2003/846; Y10T 403/32631
(Continued)

(56) References Cited

U.S. PATENT DOCUMENTS 2,815,967 A * 12/1957 Payne et al. ................... 277/315
3,208,779 A *  9/1965 Sullivan, Jr. ................... 403/134
(Continued)

FOREIGN PATENT DOCUMENTS

| CN | 1434902 A | 8/2003 |
|---|---|---|
| DE | 7225365 U | 7/1972 |

(Continued)

OTHER PUBLICATIONS

State Intellectual Property Office of the People's Republic of China, Notification of the First Office Action and Search Report; Application No. 201080057833.1; Applicant: TRW Automotive GmbH; Date of Notification: Mar. 25, 2014.
(Continued)

*Primary Examiner* — Matthew R McMahon
(74) *Attorney, Agent, or Firm* — Westerman, Hattori, Daniels & Adrian, LLP

(57) ABSTRACT

A method of fastening a sealing bellows to a ball joint as well as to a ball joint is shown comprising a joint housing, a ball stud pivotally received in the joint housing, and a sealing bellows which, related to a joint axis, comprises a first axial end of the bellows resting against the ball stud and a second axial end of the bellows fastened to the joint housing, the joint housing for fastening the sealing bellows comprising a seat of the bellows forming a radial stop as well as an axial stop for the second axial end of the bellows, and wherein a closed retaining ring is provided which is spaced from the joint housing and acts upon the sealing bellows in radial inward direction against the seat of the bellows.

8 Claims, 3 Drawing Sheets

(58) Field of Classification Search
USPC ............ 403/50, 51, 132, 134; 277/635, 636; 464/173, 175
See application file for complete search history.

(56) References Cited

U.S. PATENT DOCUMENTS

| | | | | |
|---|---|---|---|---|
| 3,343,855 | A * | 9/1967 | Husen | 403/51 |
| 3,381,987 | A * | 5/1968 | Husen | 403/51 |
| 4,017,197 | A * | 4/1977 | Farrant | 403/27 |
| 4,121,844 | A * | 10/1978 | Nemoto et al. | 277/635 |
| 4,322,175 | A * | 3/1982 | Szczesny | 403/134 |
| 4,327,925 | A * | 5/1982 | Alexander et al. | 277/636 |
| 4,345,772 | A * | 8/1982 | Woody | F16J 3/042 277/634 |
| 4,549,830 | A * | 10/1985 | Mette | 403/134 |
| 4,572,693 | A * | 2/1986 | Nemoto | 403/134 |
| 4,580,921 | A * | 4/1986 | Broszat et al. | 403/134 |
| 4,812,073 | A * | 3/1989 | Blumberg et al. | 403/134 |
| 4,832,523 | A * | 5/1989 | Glatzel et al. | 403/134 |
| 4,852,891 | A * | 8/1989 | Sugiura et al. | 277/636 |
| 4,921,368 | A * | 5/1990 | Busse | F16C 11/0671 277/634 |
| 5,005,808 | A * | 4/1991 | Warmuth et al. | 267/64.27 |
| 5,092,704 | A * | 3/1992 | Buhl et al. | 403/134 |
| 5,183,351 | A * | 2/1993 | Schneider | 277/636 |
| 6,036,180 | A * | 3/2000 | Ecktman | F16F 9/0463 267/64.27 |
| 6,350,075 | B1 * | 2/2002 | Abels | 403/134 |
| 6,357,956 | B1 | 3/2002 | Zebolsky et al. | |
| 6,676,527 | B2 * | 1/2004 | Kudo et al. | 464/175 |
| 6,749,184 | B2 * | 6/2004 | Wode et al. | 267/64.27 |
| 6,962,351 | B2 * | 11/2005 | De Freitas | 277/634 |
| 7,192,214 | B2 * | 3/2007 | Schonhoff et al. | 403/134 |
| 7,441,979 | B2 * | 10/2008 | Heidemann et al. | 403/134 |
| 7,931,279 | B2 * | 4/2011 | Niwa | F16J 3/042 277/630 |
| 8,220,785 | B2 * | 7/2012 | Bank et al. | 267/64.27 |
| 2004/0037621 | A1 * | 2/2004 | Suzuki et al. | 403/135 |
| 2006/0182491 | A1 * | 8/2006 | Bernhardt et al. | 403/134 |
| 2009/0017923 | A1 * | 1/2009 | Okubo | 464/175 |
| 2009/0047063 | A1 * | 2/2009 | Shirai et al. | 403/133 |
| 2009/0152822 | A1 * | 6/2009 | Niwa | F16J 3/042 277/634 |
| 2009/0152834 | A1 | 6/2009 | Richter et al. | |
| 2009/0209353 | A1 * | 8/2009 | Abels | B29C 45/2612 464/106 |

FOREIGN PATENT DOCUMENTS

| | | | |
|---|---|---|---|
| DE | 3741347 C1 | 11/1989 | |
| DE | 4240061 A1 | 6/1994 | |
| DE | 102007060287 A1 | 6/2009 | |
| EP | 0047343 A1 | 3/1982 | |
| EP | 0269836 A2 | 6/1988 | |
| EP | 1442831 A1 | 8/2004 | |
| EP | 1852617 A1 * | 11/2007 | ......... F16C 11/0671 |
| JP | 62-80014 | 5/1985 | |
| JP | 62-56866 | 4/1987 | |
| JP | 1-92518 | 6/1989 | |

OTHER PUBLICATIONS

German Search Report, Application No. DE102009052923.3 filed Nov. 12, 2009, dated Sep. 2, 2011.

* cited by examiner

BALL JOINT AND METHOD OF FASTENING A SEALING BELLOWS TO A BALL JOINT

CROSS-REFERENCE TO RELATED APPLICATIONS

This application is a national stage of International Application No. PCT/EP2010/006818 filed Nov. 9, 2010, the disclosures of which are incorporated herein by reference in entirety, and which claimed priority to German Patent Application No. 10 2009 052 923.3 filed Nov. 12, 2009, the disclosures of which are incorporated herein by reference in entirety.

BACKGROUND OF THE INVENTION

The invention relates to a method of fastening a sealing bellows to a ball joint as well as to a ball joint comprising a joint housing, a ball stud pivotally received in the joint housing, and a sealing bellows which, with respect to a joint axis, comprises a first axial end of the bellows resting against the ball stud and a second axial end of the bellows fastened to the joint housing, the joint housing for fastening the sealing bellows comprising a seat of the bellows both forming a radial stop as well as an axial stop for the second axial end of the bellows.

Usually, a sealing bellows is provided in ball joints in the transition region between the ball stud and the joint housing for protecting the ball joint against dirt and, if need be, for storing a lubricant. This sealing bellows has to be fastened to the ball stud, on the one hand, and to the joint housing on the other hand in a reliable and permanent manner. Further, the fastening of the bellows should be able to be realized as simply as possible in terms of manufacturing technology in order to reduce the assembly expenditure for the ball joint.

Usually, slotted clamping rings or closed retaining rings are used for fastening the sealing bellows. The elastically expandable clamping rings are clipped in place on one end of the bellows and act upon the sealing bellows radially inwards toward a seat of the bellows. The closed retaining rings, however, are plastically deformed to fix the ends of the bellows to the joint housing and the ball stud, respectively. Due to their slotted design, clamping rings have the disadvantage that they do not exert a radially inward retaining force which is constant in circumferential direction and also may cause damage to the sealing bellows at the edges of their slots.

EP 0 269 836 A2, and corresponding U.S. Pat. No. 4,812,073 A, both of which are incorporated by reference herein in entirety, discloses a device for assembling a sealing bellows to the joint housing of a ball joint. For the purpose of fastening the bellows, a closed sheet metal ring is used which has a cross-section bulging radially inwards. During assembling the bellows, the sheet metal ring is supported by a surrounding ring shoulder of the joint housing and is plastically deformed. Due to its bulged cross-section, an inner diameter of the sheet metal ring decreases during the plastic deformation so that the edge of the bellows is uniformly pressed against a seat of the bellows along the circumference.

EP 0 319 679 A2, and corresponding U.S. Pat. No. 4,921,368 A, both of which are incorporated by reference herein in entirety, also shows a generic ball joint and a method of fastening a sealing bellows to a joint housing of the ball joint. Here, a closed retaining ring is used which is supported by the joint housing and is acted upon by a tool in axial direction and radially inwards, being plastically deformed in this process. Having been plastically deformed, the sealing bellows, to be more precise a peripheral bead of the sealing bellows, is fixed to the joint housing by the retaining ring.

The described ball joints have the disadvantage that the retaining ring rests against the joint housing when the sealing bellows has been installed. As the plastically deformable retaining ring is usually manufactured from metal just like the joint housing, this junction has a very high proneness to corrosion in particular if there is moisture.

BRIEF SUMMARY OF THE INVENTION

It is a feature of the invention to provide a ball joint comprising a reliable and permanent connection between an axial end of the bellows and the joint housing which can be manufactured in a simple manner; in particular, this connection should have a low susceptibility to corrosion.

According to the invention, this feature is achieved by a ball joint of the type initially mentioned in which a closed retaining ring is provided which is spaced from the joint housing and acts upon the sealing bellows in radial inward direction against the seat of the bellows. As the retaining ring does not rest against the joint housing in this case, the risk of corrosion is low and the life expectancy of the fastening of the bellows is correspondingly long.

In one embodiment, the diameter of the retaining ring, as seen in axial direction, decreases from the second end of the bellows towards the first end of the bellows. In combination with the radial stop and the axial stop of the seat of the bellows, this conical ring shape results in a particularly resistant and reliable fastening of the second axial end of the bellows.

In this embodiment, the retaining ring is preferably bent in an outward direction at its tapered end. The sealing bellows extends from its second axial end of the bellows radially between this tapered end of the retaining ring and the radial stop of the joint housing towards its first axial end of the bellows. Due to the outwardly bent end of the retaining ring, no sharp-edged ends of the retaining ring are present in the region of contact with the sealing bellows, which could damage the sealing bellows. This in turn has a positive effect on the service life of the sealing bellows.

The assigned feature is also achieved by a method of fastening a sealing bellows to a ball joint, the ball joint comprising a sealing bellows, a joint housing, a ball stud pivotally received in the joint housing and comprising a longitudinal axis of the stud, and a retaining ring for fastening the sealing bellows, the method comprising the following steps:

a) axially positioning the retaining ring and the sealing bellows with respect to the longitudinal axis of the stud so that the retaining ring encloses the sealing bellows and the sealing bellows encloses a seat of the bellows of the joint housing; and b) pressing the retaining ring against an axial stop and a radial stop of the seat of the bellows in a force-controlled manner, the retaining ring being plastically deformed.

It has been realized that the sealing bellows may serve as a direct abutment with a suitable geometry and arrangement of the retaining ring and the second end of the bellows, the retaining ring being supported essentially by the bellows when being plastically deformed.

In a variant of the method, the retaining ring, while being plastically deformed in step b), remains to be spaced from the joint housing and is axially and radially supported by the joint housing via the bellows only in indirect manner. Thus, the retaining ring never has any contact with the joint housing, in particular not after assembly of the bellows, so that there is no contact metal to metal and the risk of corrosion is minimal even in a humid environment.

In an alternative design variant, the retaining ring, while being plastically deformed in step b), is supported by the bellows as well as an end face of the joint housing with elastic compression of the bellows, the bellows expanding again after step b) and moving the retaining ring axially away from the end face. Although the retaining ring has a short-time contact with the joint housing in the course of the method, the elasticity of the material of the bellows ensures that it is again spaced away from the joint housing after assembly of the bellows. This is why there are the same advantages as with the preceding variant of the method, i.e. a smaller risk of corrosion in the fastening area of the second end of the bellows.

Other features and advantages of this invention will become apparent to those skilled in the art from the following detailed description of the preferred embodiments, when read in light of the accompanying drawings.

DETAILED DESCRIPTION OF THE INVENTION

Figure 1:
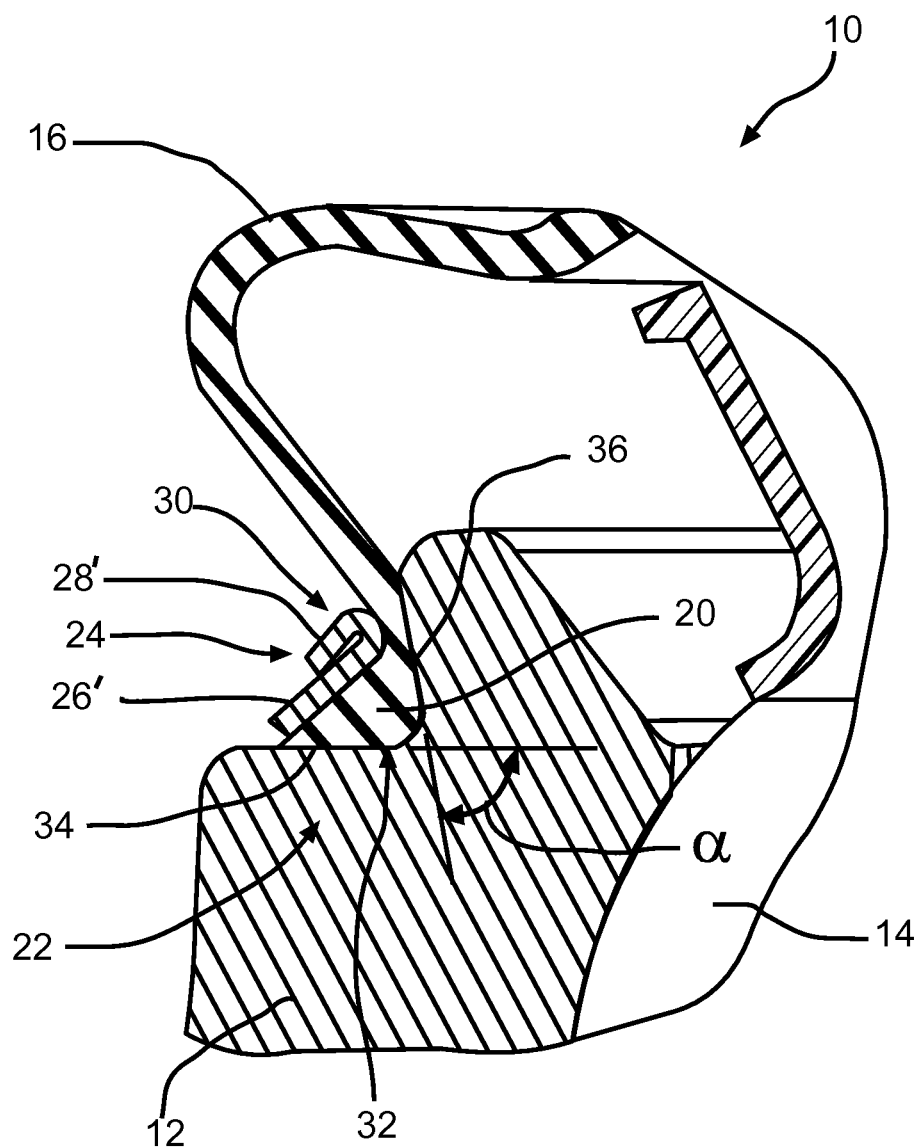
FIG. 1 shows a cut-out detail of a ball joint according to the invention, the sealing bellows being mounted.

FIG. 1 shows a ball joint 10 comprising a joint housing 12, a ball stud 14 whose ball head is pivotally received in the joint housing 12, and an already assembled sealing bellows 16 which in relation to a longitudinal axis A of the stud has a first axial end 18 of the bellows (see FIGS. 2 and 3) fastened to the ball stud 14 and a second axial end 20 of the bellows fastened to the joint housing 12. For the purpose of fastening the sealing bellows 16, the joint housing 12 comprises a seat 22 of the bellows, forming both a radial stop and an axial stop for the second end 20 of the bellows. A closed retaining ring 24 is provided which is spaced from the joint housing 12 and acts upon the sealing bellows 16 radially inwards against the seat 22 of the bellows.

In this arrangement, the retaining ring 24 is a separate, plastically deformed metal ring which is preferably made of sheet steel and substantially encloses the second end 20 of the bellows.

Figure 2:
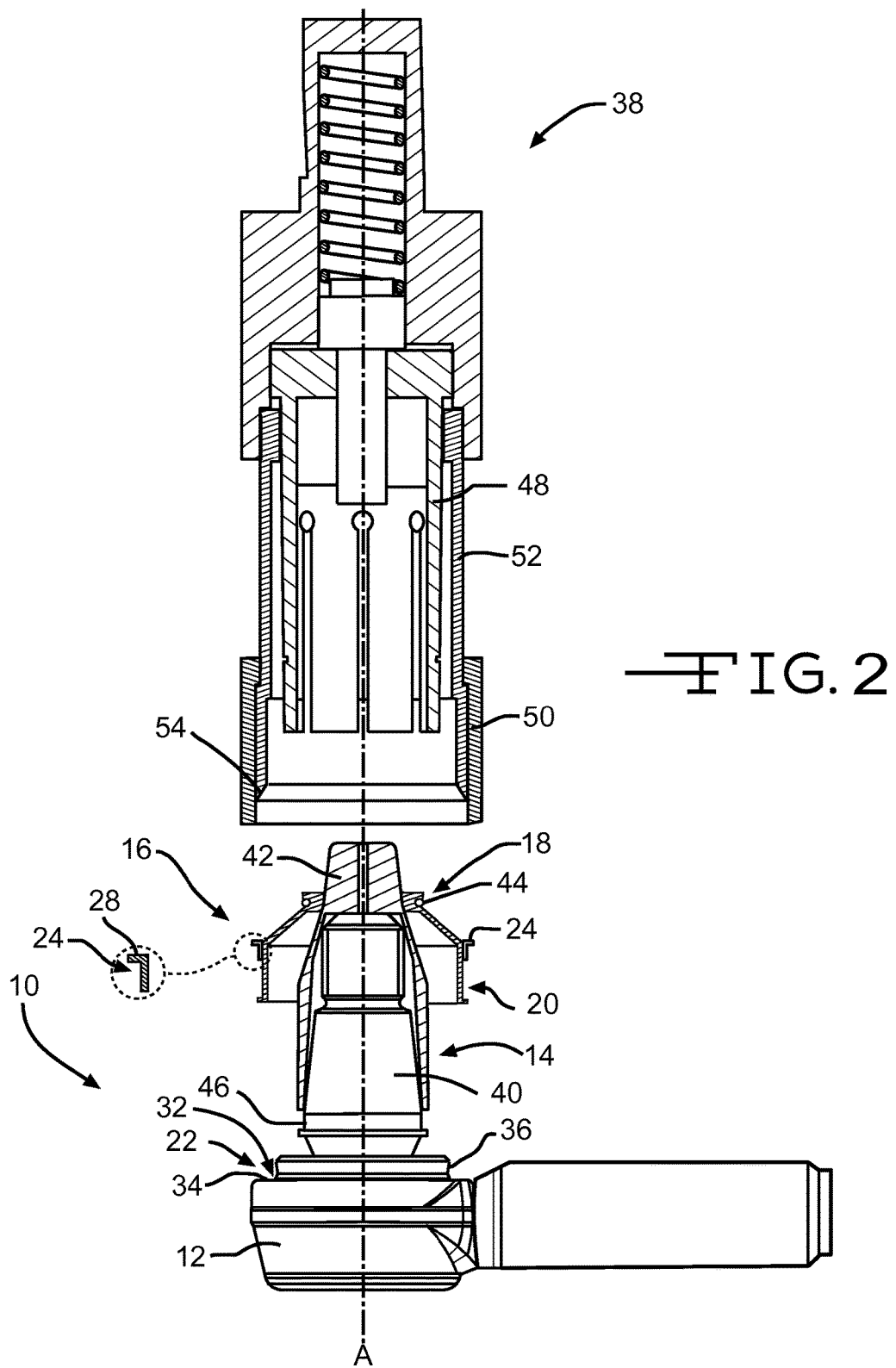
FIG. 2 shows a ball joint according to the invention prior to the process of assembling the sealing bellows.

Prior to fastening the sealing bellows 16 to the joint housing 12, the retaining ring 24 in the present embodiment has an L-shaped annular cross-section with an essentially circular cylindrical leg 26 extending in axial direction, and a further leg 28 essentially extending in radial direction (cf. detail in FIG. 2).

Following the plastic deformation of the retaining ring 24 during assembling the bellows, the retaining ring 24 conically tapers as seen in an axial direction from the second end 20 of the bellows towards the first end 18 of the bellows. The sealing bellows 16 extends from its second axial end 20 of the bellows between a tapered ring end 30 of the retaining ring 24 and the joint housing 12 towards its first axial end 18 of the bellows. In order to avoid that the contacting sealing bellows 16 is damaged by sharp edges, the retaining ring 24 is bent outwards at its tapered ring end 30 by approximately 180° and hence is rounded.

Specifically, during the deformation process of the retaining ring 24, the initially cylindrical leg 26 (FIG. 2) is deformed into a conical leg 26' (FIG. 1), the leg 26' in the transition area to the leg 28 (or 28') having a reduced diameter as compared to the original diameter. Further, the originally radial leg 28 is deformed into a leg 28' extending approximately parallel to the deformed leg 26' and resting against leg 26'.

Figure 3:
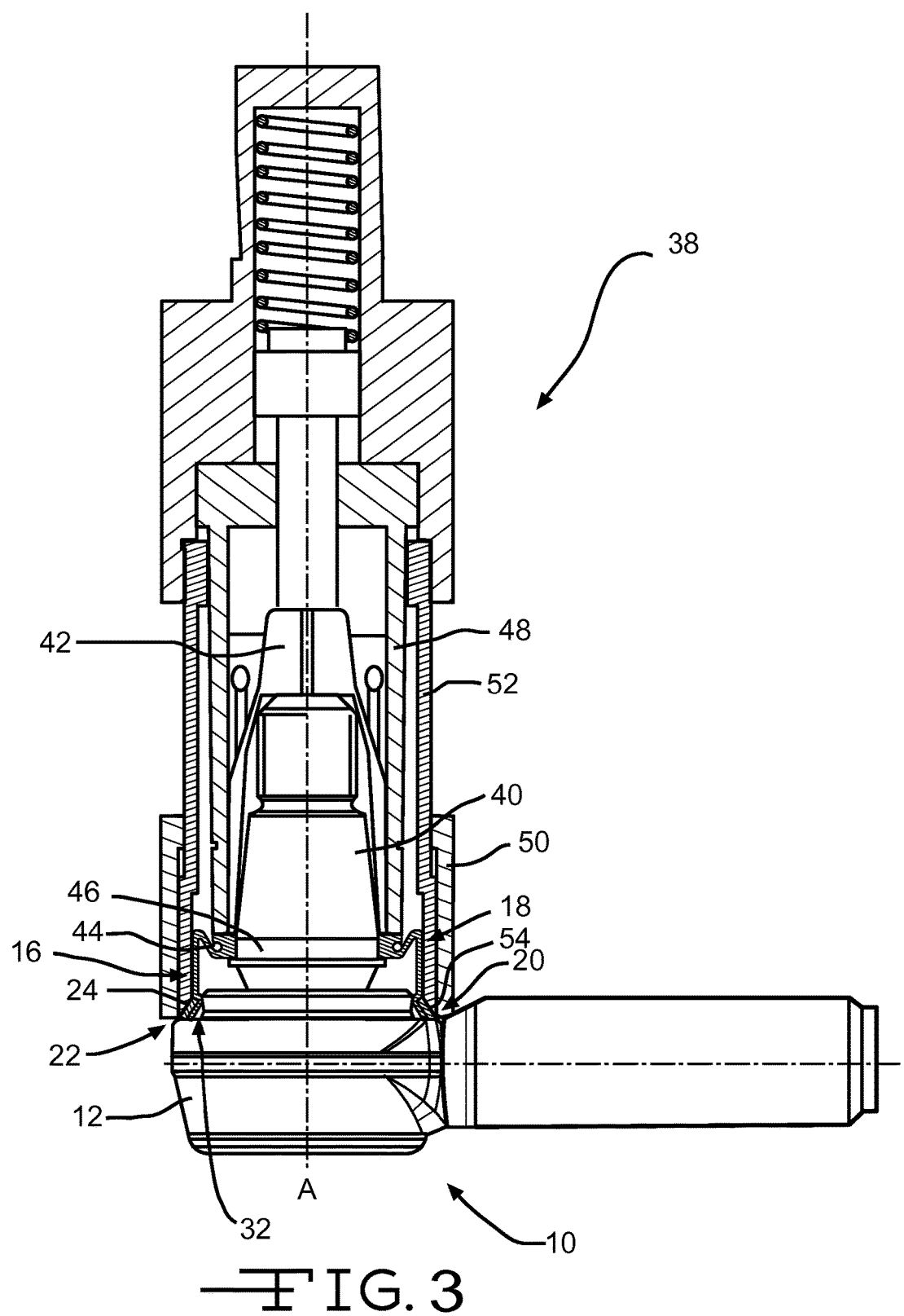
FIG. 3 shows a ball joint according to the invention shortly after the process of assembling the sealing bellows.

According to FIGS. 1 to 3, the seat 22 of the bellows on the joint housing 12 is a housing shoulder 32 surrounding the ball stud 14. This housing shoulder 32 comprises an end face 34 defining the axial stop and a side face 36 defining the radial stop. In combination with the deformed retaining ring 24, this results in a surrounding annular space with an essentially triangular cross-section, which is preferably completely filled with the material of the second end 20 of the bellows (FIG. 1). It is preferred here that the second end 20 of the bellows is realized as a thickened bead so that a firm and reliable fastening of the retaining ring 24 to the joint housing 12 is obtained.

It has to be emphasized that the retaining ring 24 does neither rest against the end face 34 nor against the side face 36, but is spaced from the joint housing 12 by the intermediate material of the bellows. Thus, the metal retaining ring 24 is separated from the joint housing 12 (likewise made of metal) by the sealing bellows 16 which is usually made of an elastic synthetic material so that there is no contact metal to metal; therefore, the risk of corrosion even in a humid or wet environment is minimized.

According to FIG. 1, the end face 34 of the housing shoulder 32 extends substantially perpendicularly to the joint axis A and encloses an angle α<90° with the side face 36. With an angle which is smaller than 90°, the resistance against axially pulling the sealing bellows 16 away from the joint housing 12 is increased, as the second axial end 20 of the bellows (and hence the retaining ring 24, too) would have to expand in radial direction.

In the following, the method of fastening the sealing bellows 16 to the ball joint 10 will be explained on the basis of FIGS. 2 and 3.

FIG. 2 shows the ball joint 10 prior to the assembly of the bellows, the joint axis A being vertically aligned. Further, a part of an assembly machine 38 can be seen, which is movable in the direction of the joint axis A.

An assembly cone 42 is placed on a shaft 40 of the ball stud 14 to facilitate the assembly of the sealing bellows 16. This assembly cone 42 in turn has the sealing bellows 16 attached to it, the second axial end 20 of the bellows facing the joint housing 12. Compared to the second axial end 20 of the bellows, the first axial end 18 of the bellows has a smaller inner diameter so that initially the first axial end 18 of the bellows rests against the assembly cone 42. According to FIG. 2, the ball joint 10 comprises a fastening ring 44 which is pre mounted to the first axial end 18 of the bellows. The retaining ring 24 is likewise already arranged on the sealing bellows 16, it being positioned on the second end 20 of the bellows straight away or, as shown in FIG. 2, taking an axial intermediate position first.

In a first step, the retaining ring 24 and the sealing bellows 16 are positioned by means of the assembly machine 38 in axial direction such that the retaining ring 24 encloses the sealing bellows 16 and the sealing bellows 16 encloses a seat 22 of the bellows of the joint housing 12. In a second, subsequent step the retaining ring 24 is pressed in a force-controlled manner against an axial stop and a radial stop of the seat 22 of the bellows, the retaining ring 24 being essentially supported by the sealing bellows 16 and being plastically deformed.

In particular in the first step already, the first axial end 18 of the bellows is being fixed on a seat 46 of the bellows of the ball stud 14 by the fastening ring 44. The fastening ring 44 is a slotted clamping ring and the seat 46 of the bellows of the ball stud 14 is a cylindrical portion against which the first end 18 of the bellows is pressed by the fastening ring 44. As an alternative, the seat 46 of the bellows may also be a groove, with the clamping ring in the first step being first elastically expanded by the assembly cone 42 and then snapping in place in the groove.

Specifically, a first tool 48 of the assembly machine 38 initially engages the first axial end 18 of the bellows in the first step and positions the entire sealing bellows 16 along with the fastening ring 44 and the retaining ring 24 in an axial direction until the fastening ring 44 has reached its fastening position on the seat 46 of the bellows of the ball stud 14. Thereafter, a further, second tool 50 of the assembly machine 38 engages the retaining ring 24 in order to position the retaining ring 24 and the second axial end 20 of the bellows in axial direction.

In the second step, finally, a cone-shaped, third tool 52 of the assembly machine 38 engages the retaining ring 24, presses the retaining ring 24 both in axial direction and radially inwards against the joint housing 12 and deforms the retaining ring 24 in plastic manner such that a diameter of the retaining ring 24 is reduced at least in sections. In doing so, an initially cylindrical portion of the retaining ring 24 (FIG. 2, leg 26) is deformed by a conical contact face 54 of the third tool 52 into a conical portion (FIG. 1, leg 26').

FIGS. 2 and 3 clearly show that the process of fastening the sealing bellows 16 to the ball stud 14 and the joint housing 12 can be carried out with simple manufacturing technology in one single operation by the assembly machine 38. Starting from FIG. 2, the illustrated part of the assembly machine 38, or individual tools 48, 50, 52, is/are moved axially towards the joint housing 12 until the final assembled state according to FIG. 3 is reached in the end. Thereafter, the assembly machine 38 can be moved back to its starting condition according to FIG. 2, and a new ball joint 10 along with a sealing bellows 16 to be mounted may be inserted.

During the plastic deformation of the retaining ring 24 by means of the conical tool 52 in the second step, the retaining ring 24—in a variant of the method—remains to be spaced from the joint housing 12 and is axially and radially supported only by the sealing bellows 16 and is supported by the joint housing 12 only in indirect fashion through the sealing bellows 16. In this variant of the method, the material properties of the sealing bellows 16 as well as the thickness of the material of the bellows between the retaining ring 24 and the end face 34 of the joint housing 12 are crucial. Depending on these parameters, the force-controlled pressing action of the retaining ring 24 by the conical tool 52 can be subsequently adjusted such that the retaining ring 24 indeed is plastically deformed in the desired way, but does not come into contact with the joint housing 12. The material of the bellows located between the retaining ring 24 and the end face 34 is compressed in this process, but in the end provides an axial resisting force which is larger than the axial force of the third tool 52 required for deforming the retaining ring 24.

In an alternative variant of the method, the end face 34 is temporarily used as a direct axial abutment for the retaining ring 24 during the deformation of the retaining ring 24. During its plastic deformation, the retaining ring 24 is supported in the second step with elastic compression of the sealing bellows 16 both by the sealing bellows 16 and the end face 34 of the joint housing 12; as soon as the tools 48, 50, 52 are removed, however, the sealing bellows 16 widens again and the retaining ring 24 moves away from the end face 34 in axial direction.

In each case, the retaining ring 24 is spaced from the joint housing 12 after assembly of the sealing bellows 16 so that only a small risk of corrosion exists in this fastening area.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A ball joint, comprising:
a joint housing,
a ball stud pivotally received in the joint housing, and
a sealing bellows which, with respect to a joint axis, comprises a first axial end of the bellows resting against the ball stud and a second axial end of the bellows fastened to the joint housing,
wherein the joint housing for fastening the sealing bellows comprises a seat of the bellows forming both a radial stop face as well as an axial stop face for the second axial end of the sealing bellows,
wherein a closed retaining ring is provided as a separate element formed as a plastically deformed sheet metal ring, which is spaced from the joint housing,
wherein said retaining ring is bent only in an outward direction away from the joint housing at a rounded tapered ring end such that the tapered ring end has no sharp-edged ends and is rounded at a region of contact between the retaining ring and the sealing bellows,
wherein the entire length of the retaining ring until said rounded tapered ring end, as seen in the axial direction, defines a linearly tapered conical surface with a diameter that decreases along the entire length of the retaining ring until said rounded tapered ring end from the second end of the bellows towards the first end of the bellows,
wherein the second end of the sealing bellows, in a mounted condition, fills an annular space of triangular cross-section defined by the tapered conical surface and the respective radial and axial stop faces of the seat at a triangle-shaped section of the sealing bellows,
wherein the tapered conical surface is arranged to engage an outer flat side of the triangle-shaped section of the sealing bellows, opposite the radial and axial stop faces, and to urge the second end of the sealing bellows in a radial inward direction and in an axial direction against the seat of the bellows for direct contact with the radial stop face and the axial stop face,
the radial stop face being conical, and the linearly tapered conical surface of the retaining ring extending at an angle with respect to the opposite conical radial stop face with an angle which is less than 90 degrees, and
wherein the retaining ring is separated from and free from contact with the radial stop face and the axial stop face by said sealing bellows.

2. The ball joint according to claim 1, wherein the retaining ring is bent in an outward direction away from the joint housing at said rounded tapered ring end by about 180°.

3. The ball joint according to claim 1, wherein an end face of the joint housing extends perpendicularly to the joint axis.

4. The ball joint according to claim 1, wherein the seat of the sealing bellows is a housing shoulder surrounding the ball stud.

5. The ball joint according to claim 4, wherein the housing shoulder comprises an end face defining the axial stop face and a side face defining the radial stop face.

6. The ball joint according to claim 5, wherein the end face and the side face include an angle <90°.

7. The ball joint according to claim 6, wherein the retaining ring acting in the radial inward direction produces a force and the angle between the end face and the side face causes the force to compress the bellows against the end face such that the sealing bellows contacts and is held against the end face.

8. The ball joint according to claim 1, wherein a radial leg of the retaining ring beyond said rounded tapered ring end extends substantially parallel to the linearly tapered conical surface of the retaining ring.

* * * * *